(12) United States Patent
Takahashi

(10) Patent No.: US 8,284,295 B2
(45) Date of Patent: Oct. 9, 2012

(54) DIGITAL CAMERA

(75) Inventor: Shigeo Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 618 days.

(21) Appl. No.: 12/155,738

(22) Filed: Jun. 9, 2008

(65) Prior Publication Data

US 2008/0309771 A1 Dec. 18, 2008

(30) Foreign Application Priority Data

Jun. 12, 2007 (JP) ................................. 2007-155358

(51) Int. Cl.
*G03B 13/00* (2006.01)
*H04N 5/232* (2006.01)
(52) U.S. Cl. .......... 348/352; 348/208.4; 396/79; 396/89
(58) Field of Classification Search ............ 348/208.99, 348/208.1, 208.2, 208.4, 208.5, 208.7, 208.11, 348/208.12, 345, 348, 349, 350, 351, 352, 348/353, 354, 356; 396/72, 77, 79, 80, 81, 396/82, 89, 91, 92, 101, 121, 122, 123, 124
See application file for complete search history.

(56) References Cited

U.S. PATENT DOCUMENTS

| | | | | | |
|---|---|---|---|---|---|
| 4,719,486 | A | * | 1/1988 | Hoshino et al. | 396/96 |
| 4,774,538 | A | * | 9/1988 | Kawai | 396/53 |
| 5,371,539 | A | * | 12/1994 | Okino et al. | 348/208.6 |
| 5,379,088 | A | * | 1/1995 | Ueda et al. | 396/49 |
| 6,721,013 | B1 | * | 4/2004 | Tsujino | 348/345 |
| 6,781,632 | B1 | * | 8/2004 | Ide | 348/345 |
| 6,819,360 | B1 | * | 11/2004 | Ide et al. | 348/340 |
| 6,933,978 | B1 | * | 8/2005 | Suda | 348/345 |
| 7,102,681 | B1 | * | 9/2006 | Kashiyama | 348/353 |
| 7,512,328 | B2 | * | 3/2009 | Suda | 396/52 |
| 2004/0169767 | A1 | * | 9/2004 | Norita et al. | 348/350 |
| 2006/0170784 | A1 | | 8/2006 | Clarke et al. | |

(Continued)

FOREIGN PATENT DOCUMENTS

JP A-09-105970 4/1997

(Continued)

OTHER PUBLICATIONS

Nov. 15, 2011 Extended European Search Report in European Patent Application No. 08 15 7742.1.

(Continued)

*Primary Examiner* — Aung S Moe
*Assistant Examiner* — Chriss Yoder, III
(74) *Attorney, Agent, or Firm* — Oliff & Berridge, PLC

(57) ABSTRACT

A digital camera comprises an imaging/focus detection element, in which focus detection pixel rows are incorporated in a two-dimensional array of a plurality of imaging pixels, that outputs image signals and focus detection signals, a focus detection unit that detects a state of focal adjustment at a photographic optical system based upon the focus detection signal, an image blur detection unit that detects an image blur quantity, a reliability judgment unit that judges, based upon the blur quantity, whether or not the state of focal adjustment detected in correspondence to a focus detection pixel row disposed along a direction different from a rolling shutter scanning direction among the focus detection pixel rows is reliable, and a focal adjustment unit that executes focal adjustment for the photographic optical system based upon the state of focal adjustment judged to be reliable by the reliability judgment unit.

8 Claims, 18 Drawing Sheets

U.S. PATENT DOCUMENTS

2009/0147091 A1* 6/2009 Myers et al. ............. 348/208.99

FOREIGN PATENT DOCUMENTS

| JP | A-2000-292686 | 10/2000 |
| JP | A-2000-330006 | 11/2000 |
| JP | A-2003-007994 | 1/2003 |
| JP | A-2003-156677 | 5/2003 |
| JP | A-2006-184679 | 7/2006 |
| JP | A-2007-041570 | 2/2007 |
| WO | WO 2006-043315 A1 | 4/2006 |

OTHER PUBLICATIONS

Jul. 13, 2012 European Office Action issued in EP Application No. 08 157 742.1.

* cited by examiner

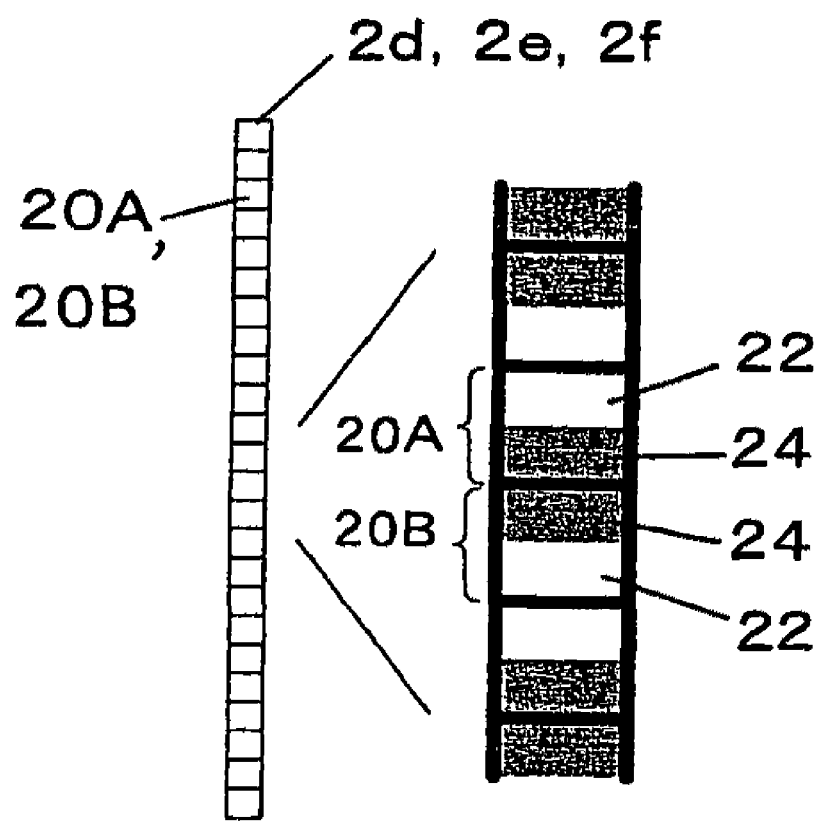

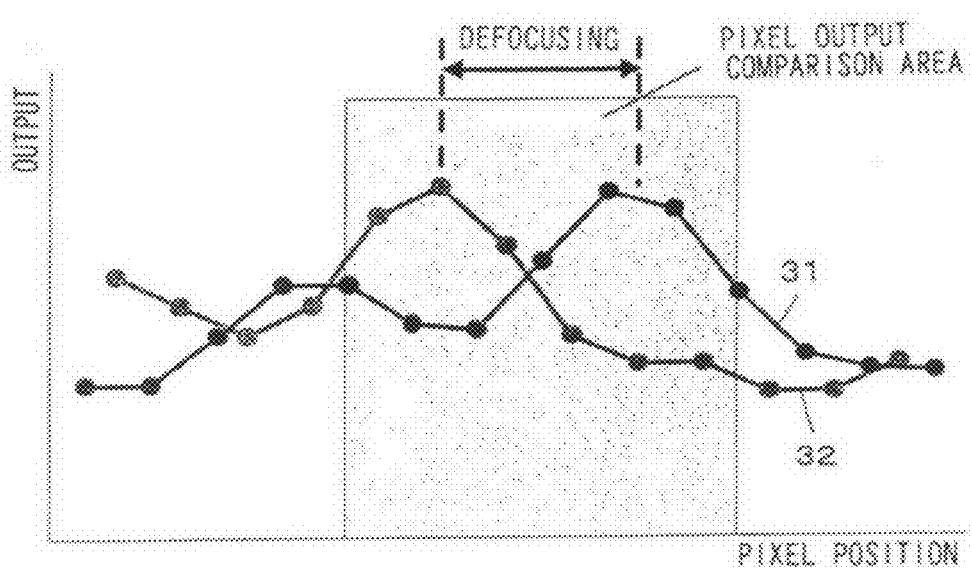

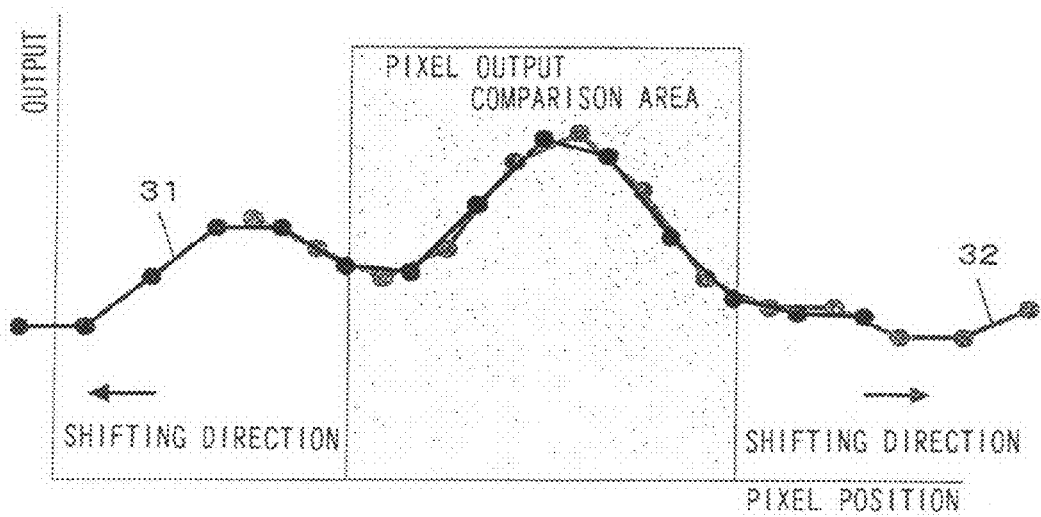

DIGITAL CAMERA

INCORPORATION BY REFERENCE

The disclosure of the following priority application is herein incorporated by reference: Japanese Patent Application No. 2007-155358 filed Jun. 12, 2007

BACKGROUND OF THE INVENTION

1. Field of the Invention

The present invention relates to a digital camera.

2. Description of Related Art

There are imaging apparatuses known in the related art, which are equipped with a CMOS image sensor constituted with imaging pixels arrayed in a two-dimensional pattern. Such an imaging apparatus in the known art may include focus detection pixels replacing some of the imaging pixels arrayed at the image sensor, so as to output an image signal making up a subject image formed through a photographic lens and a focus detection signal indicating the state of focal adjustment at the photographic lens, both from the image sensor (see Japanese Laid Open Patent Publication No. 2600-292686).

The focus detection pixels at the imaging apparatus in the related art described above may be arrayed in a row running along a direction different from the scanning direction of the rolling shutter. If an image blur occurs when reading out the focus detection signal from the focus detection pixel row under such circumstances, the focus detection signal is bound to contain a noise component attributable to the image blur. A problem thus arises in that if focus detection calculation is executed based upon such a focus detection signal containing a noise component, the reliability of the detection results will be compromised.

SUMMARY OF THE INVENTION

A digital camera according to a first aspect of the present invention comprises an imaging/focus detection element adopting a rolling shutter system, in which focus detection pixel rows each made up with a plurality of focus detection pixels are incorporated in a two-dimensional array of a plurality of imaging pixels, that receives a light forming an image via a photographic optical system and outputs image signals and focus detection signals, a focus detection unit that detects a state of focal adjustment at the photographic optical system based upon the focus detection signals output from the focus detection pixel rows, an image blur detection unit that detects an image blur quantity indicating an extent of a blur on the image, a reliability judgment unit that judges, based upon the blur quantity, whether or not the state of focal adjustment detected by the focus detection unit in correspondence to a focus detection pixel row disposed along a direction different from a rolling shutter scanning direction among the focus detection pixel rows is reliable, and a focal adjustment unit that executes focal adjustment for the photographic optical system based upon the state of focal adjustment judged to be reliable by the reliability judgment unit.

According to a second aspect of the present invention, in the digital camera of the first aspect, the reliability judgment unit is able to judge that the state of focal adjustment is not reliable if a cumulative blur quantity value exceeds a predetermined threshold value.

According to a third aspect of the present invention, in the digital camera of the first aspect, the reliability judgment unit may include a comparison judgment unit that calculates a parameter indicating the reliability of the state of focal adjustment and judges the reliability of the state of focal adjustment by comparing the parameter with a threshold value and a modifying unit that modifies the threshold value in correspondence to a cumulative value of the blur quantity.

According to a fourth aspect of the present invention, in the digital camera of any of the first through third aspects, it is preferable that the image blur detection unit detects the image blur quantity in correspondence to each of the focus detection pixel rows and the reliability judgment unit judges the reliability of the state of focal adjustment for each focus detection pixel row based upon the image blur quantity detected in correspondence to the focus detection pixel row.

According to a fifth aspect of the present invention, in the digital camera of any of the first through fourth aspects, the image blur detection unit may detect unsteady hand movement of the photographer and also detects subject movement and detects the image blur quantity based upon the unsteady hand movement and the subject movement.

BRIEF DESCRIPTION OF THE DRAWINGS

FIG. 6 shows in detail a focus detection pixel row disposed along the longitudinal side of the photographic image plane;

FIG. 7 shows a pair of output signal strings output from a focus detection pixel row;

FIG. 8 illustrates how the extent of correlation may be calculated by shifting the pair of output signal strings output from the focus detection pixel row relative to each other;

DESCRIPTION OF PREFERRED EMBODIMENTS

Figure 1:
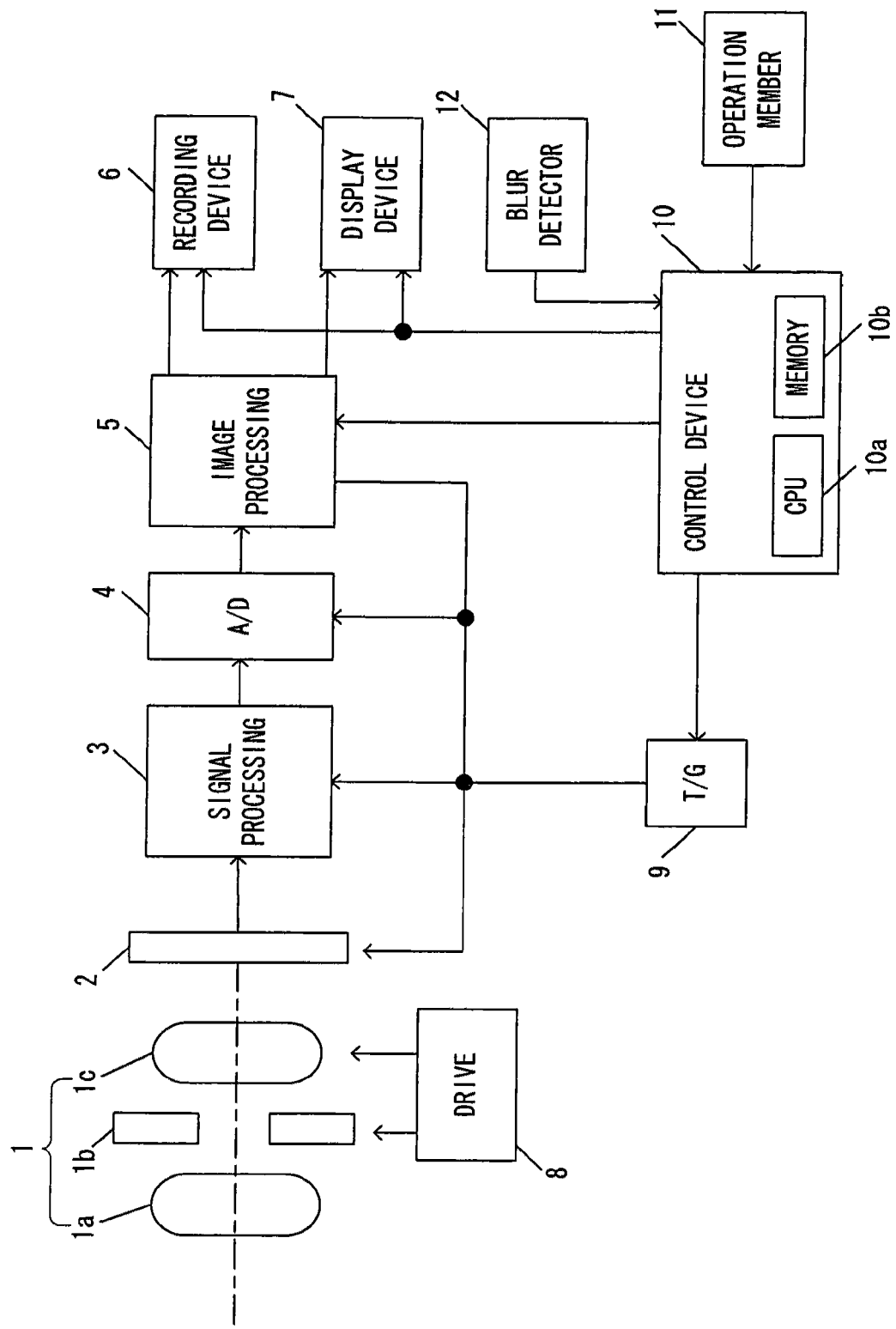
FIG. 1 shows the structure adopted in the digital camera achieved in an embodiment.

FIG. 1 shows the structure of the digital camera achieved in an embodiment. A photographic lens 1, which includes a zooming lens 1a, an aperture 1b and a focusing lens 1c, forms a subject image onto a light-receiving surface of an imaging/focus detection element 2. The imaging/focus detection element 2 is a CMOS image sensor with a plurality of pixels arrayed on a flat surface and reads out the outputs from the individual pixels through a rolling shutter method. The imaging/focus detection element 2 includes imaging pixels and focus detection pixels, and outputs focus detection signals indicating the state of focal adjustment at the photographic lens as well as image signals constituting the subject image formed through the photographic lens 1. The imaging/focus detection element 2 is to be described in detail later.

A signal processing circuit 3 executes amplification processing and gain adjustment on the image signals and the focus detection signals output from the imaging/focus detection element 2. An A/D converter 4 converts the image signals and the focus detection signals having undergone the processing at the signal processing circuit 3 to digital signals. An image processing circuit 5 executes various types of correction processing and compression processing on the digitized image signals resulting from the conversion at the A/D converter 4 and also generates image signals during a photographing operation by interpolating outputs from the focus detection pixels based upon the outputs from nearby imaging pixels. A recording device 6 records the photographic image into a detachable recording medium such as a memory card. A display device 7 brings up on display at a liquid crystal display unit mounted at the camera rear surface a through photographic image or various types of photographic information.

A drive circuit 8 controls the drive of the aperture 1b and the focusing lens 1c. A timing generator (T/G) 9 outputs timing signals used to start or end the specific processing executed at the individual signal recipients, such as the imaging/focus detection element 2, the signal processing circuit 3, the A/D converter 4 and the image processing circuit 5. A control device 10 includes a CPU 10a, a memory 10b and a timer 10c. The control device 10 executes camera sequence control, imaging control, focus detection control, focal adjustment control, image processing control, image recording control, image display control and the like by controlling the image processing circuit 5, the recording device 6, the display device 7, the drive circuit 8 and the timing generator 9. It is to be noted that in the memory 10b, which is utilized as various types of software counters and software flags, a cumulative image blur quantity value corresponding to each focus detection pixel row and the like are also stored.

An operation member 11, constituted with switches, a command dial, a cross key or the like, via which various operations are performed on the camera, is connected to the control device 10. The operation member 11 includes a release halfway press switch which enters an ON state or an OFF state by interlocking with a halfway press operation at a shutter button, a shutter release switch that enters an ON state or an OFF state by interlocking with a full press operation at the shutter button, a photographing mode selector via which a specific photographing mode, e.g., the continuous shooting mode, among various photographing modes, is selected and the like.

A blur detector 12, equipped with a gyro sensor, detects an image blur quantity indicating the extent of image blur. Namely, the blur detector 12 detects a camera vibration quantity attributable to an unsteady hand movement of the photographer holding the camera, calculates a movement vector by detecting the difference between images captured in succession and detects a subject movement quantity indicating the extent to which the subject has moved based upon the movement vector. Based upon the camera vibration quantity and the subject movement quantity thus detected, the blur detector 12 determines the image blur quantity.

Figure 2:
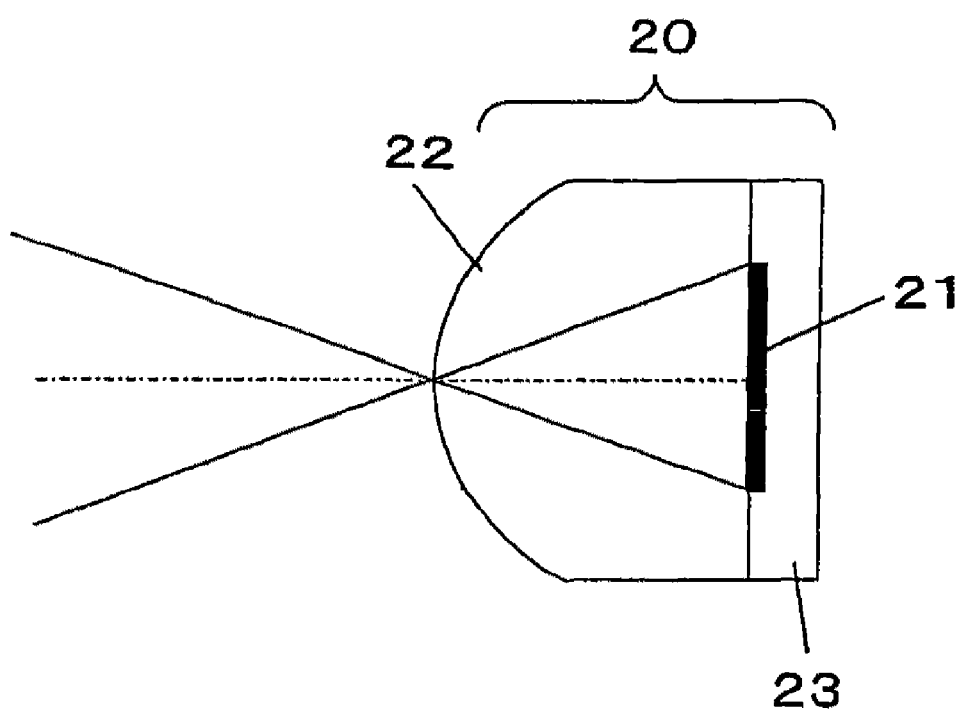
FIG. 2 is a sectional view of a pixel in the imaging/focus detection element.

FIGS. 2 through 6 illustrate the structure of the imaging/focus detection element 2. FIG. 2 is a sectional view of one of pixels 20 constituting the imaging/focus detection element 2. The imaging focus detection element 2 includes such pixels 20 disposed in a two-dimensional array. The pixels 20 each include a micro lens 22 disposed to the front of a photoelectric conversion portion 21. The photoelectric conversion portion 21 is formed on a semiconductor-substrate 23 shared by all the pixels.

Figure 3:
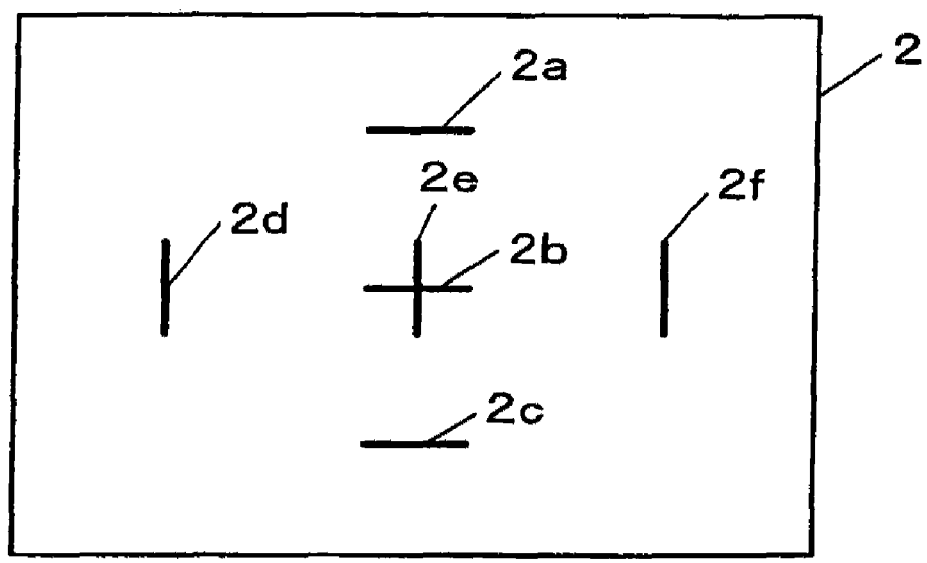
FIG. 3 is a front view of the imaging/focus detection element.
Figure 4:
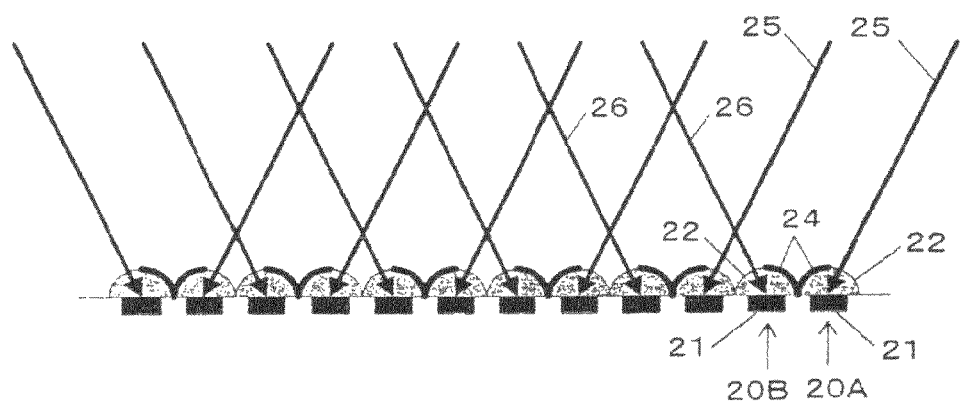
FIG. 4 is a sectional view of a focus detection pixel row.
Figure 5:
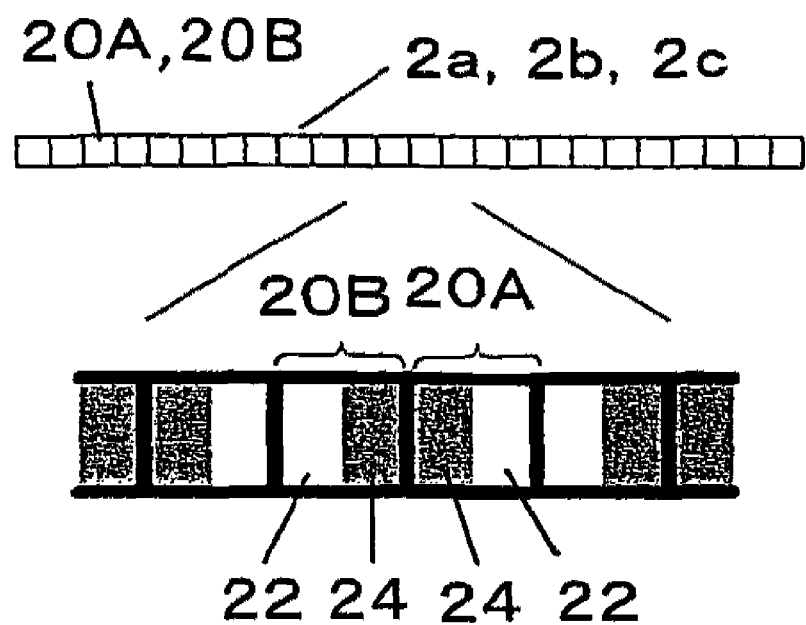
FIG. 5 shows in detail a focus detection pixel row disposed along the lateral side of the photographic image plane.

FIG. 3 is a front view (view of the light-receiving surface) of the imaging focus detection element 2, illustrating how focus detection pixel rows 2a, 2b, 2c, 2d, 2e and 2f are set. As shown in FIGS. 4 through 6, focus detection pixels 20A and focus detection pixels 20B are alternately disposed in a single file in the focus detection pixel rows 2a~2f. As shown in FIG. 2, the focus detection pixels 20A and 20B each include a shield mask 24 mounted to the front of the micro lens 22 of the pixel 20. The focus detection pixel rows 2a~2f are disposed each at a position corresponding to one of a plurality of focus detection areas set in the photographic image plane of the photographic lens 1. It is to be noted that pixels 20 other than the focus detection pixels 20A and 20B are referred to as imaging pixels for purposes of convenience in the description.

The shield mask 24, assuming the shape of a circular arc ranging through the vertex of the micro lens 22, is mounted so as to cover half of the surface of the micro lens 22. The shield masks 24 are disposed so that the surfaces of adjacent focus detection pixels 20A and 20B are shielded from light by the respective shield masks 24, are in symmetry. In other words, the focus detection pixels 20A and 20B are disposed alternately in the focus detection pixel rows 2a~2f so that the shielded surface of a focus detection pixels 20A, shielded from light by the shield mask 24, is present on a side opposite from the side on which the adjacent focus detection pixels 20B are shielded from light by the corresponding shield masks 24.

The focus detection pixel rows 2a, 2b and 2c are disposed so that they each extend along the lateral side (in the left/right direction) of the photographic image plane. The focus detection pixels 20A and 20B in the focus detection pixel rows 2a, 2b and 2c are alternately arrayed so that they are shielded from light by the respective shield masks 24 on alternate sides along the lateral direction as shown in FIG. 5. The focus detection pixel rows 2d, 2e and 2f are disposed so that they each extend along the longitudinal side (in the up/down direction) of the photographic image plane. The focus detection pixels 20A and 20B in the focus detection pixel rows 2d, 2e and 2f are alternately arrayed so that they are shielded from light by the respective shield masks 24 on alternate sides along the longitudinal direction as shown in FIG. 6.

The imaging/focus detection element 2 is disposed on an estimated focal plane of the photographic lens 1. A light flux originating from the subject, having passed through the exit pupil of the photographic lens 1, is received at the imaging pixels, i.e., the pixels other than the focus detection pixels 20A and 20B. The focus detection pixels 20A and 20B, on the other hand, each receive a light flux 25 or 26 (referred to as a focus detection light flux in the description) having passed through one of the two areas defined by splitting the exit pupil of the photographic lens 1 along the lateral (left/right) direction or along the longitudinal (up/down) direction, as shown in FIG. 4. In other words, the focus detection pixels 20A in the focus detection pixel rows 2a~2f each face the subject image formed through the photographic lens 1 from the right side or the upper side, whereas the focus detection pixels 20B in the focus detection pixel rows 2a~2f each face the subject image formed through the photographic lens 1 from the left side or the lower side.

The focus detection light flux 25 having passed through one of the two areas defined by splitting the exit pupil of the photographic lens 1 is received at the focus detection pixels 20A in the individual focus detection pixel rows 2a~2f. The focus detection light flux 26 having passed through the other area is received at the focus detection pixels 20B. Then, an offset quantity indicating the extent of a relative offset manifested by the output signal string constituted with the output signals from the focus detection pixels 20A and the output signal string constituted with the output signals from the focus detection pixels 20B, i.e., the phase difference, is detected. The state of focal adjustment at the photographic lens 1, i.e., the defocus quantity, can be detected based upon the offset quantity manifesting as the phase difference between the pair of signal strings.

At the focus detection pixel rows 2a, 2b and 2c ranging along the lateral direction, the offset quantity indicating the extent of offset manifested by a pair of focus detection light fluxes 25 and 26 having passed through a pair of areas separated from each other along the lateral side (along the left/right direction) of the exit pupil of the photographic lens 1 is detected. Based upon the detection results, the defocus quantity indicating the extent of defocusing at the photographic lens 1 along the lateral side of the photographic image plane is detected. At the focus detection pixel rows 2d, 2e and 2f ranging along the longitudinal direction, the offset quantity indicating the extent of offset manifested by a pair of focus detection light fluxes 25 and 26 having passed through a pair of areas separated from each other along the longitudinal side (along the up/down direction) of the exit pupil of the photographic lens 1 is detected. Based upon the detection results, the defocus quantity indicating the extent of defocusing at the photographic lens 1 along the longitudinal side of the photographic image plane is detected.

FIGS. 7 and 8 each show a pair of output signal strings that may be output from any of the focus detection pixel rows 2a~2f. A signal string 31 made up with signals output from the focus detection pixels 20A having received the focus detection light flux 25 (see FIG. 4) is compared with a signal string 32 made up with signals output from the focus detection pixels 20B having received the focus detection 20, light flux 26 in correspondence to each focus detection pixel row (2a~2f). At this time, the pair of signal strings 31 and 32 are first shifted relative to each other and then are compared with each other. However, the comparison operation cannot be executed over the full range of each focus detection pixel row (2a~2f). Accordingly, the comparison operation is executed within a "pixel output comparison area" within the focus detection pixel row, indicated as the hatched area in the figures.

Let us now assume that a pair of focus detection signal strings 31 and 32, such as those shown in FIG. 7, have been detected at a given focus detection pixel row. At this time, the correlation quantity indicating the extent of correlation between the signal string 31 and the signal string 32 is calculated within the pixel output comparison area by shifting the focus detection signal strings 31 and 32 relative to each other. The focus detection signal strings 31 and 32 are continuously shifted until the correlation quantity calculated as described above for the focus detection signal rows 31 and 32 assumes the smallest value within the pixel output comparison area, as shown in FIG. 8. The shift quantity by which the focus detection signal rows are shifted relative to each other until the correlation quantity assumes the smallest value is equivalent to the extent of focus misalignment manifesting at the photographic lens 1. This focus misalignment quantity is then converted to a defocus quantity by using a conversion coefficient determined in correspondence to the pixel pitch assumed at the focus detection pixel rows (2a~2f), the specifications of the micro lenses 22 and the like.

Figure 9A:
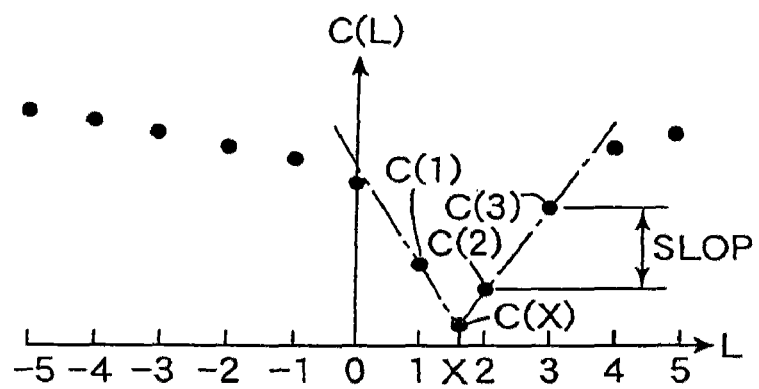
FIGS. 9A, 9B and 9C illustrate a method that may be adopted to determine through arithmetic operation the extent of correlation between the pair of focus detection signal strings and the reliability of the arithmetic operation results.
Figure 9B:
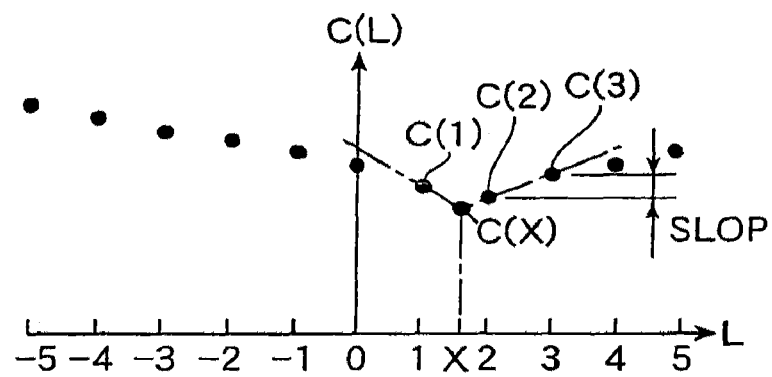
Figure 9C:
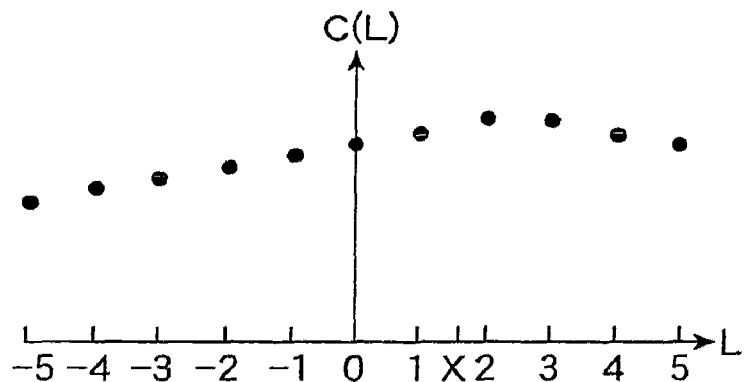

In reference to FIGS. 9A through 9C, the correlation calculation processing executed on a given focus detection pixel row by adopting a split-pupil phase difference detection method is explained. A correlation quantity C(L) indicating the extent of correlation is determined by using the differential correlation algorithm expressed in (1) below with ei and fi (i=1~m) representing the signal strings 31 and 32 making up a pair of signal strings from the subject focus detection pixel row.

$$C(L)=\Sigma|e(i+L)-f(i)| \quad (1)$$

L in expression (1) is an integer indicating a relative shift quantity taking on a value incremented/decremented in units corresponding to the pitch assumed at the pair of signal strings ei and fi. In addition, L takes on a value within a range Lmin~Lmax (−5~+5 in the example presented in FIG. 9). Σ indicates a summation operation executed over the range corresponding to the parameter i. The parameter i assumes a range p~q and the range is set so as to satisfy the condition expressed as 1≦p<q≦m. The range of the pixel output comparison area mentioned earlier is set in correspondence to the values of p and q.

The results of the arithmetic operation executed as expressed in (1) may indicate that the correlation quantity C(L) assumes the smallest value at the shift quantity L=Kj at which the pair of signal strings ei and fi achieve a high level of correlation (when kj=2 in FIG. 9A). The shift quantity x, which gives the smallest value C (L) min=C (X) in the continuous correlation quantity graph, is determined by adopting a three-point interpolation method expressed in (2) through (5) below.

$$X=kj+D/SLOP \quad (2)$$

$$C(x)=C(kj)-|D| \quad (3)$$

$$D\{C(kj-1)-C(kj+1)\}/2 \quad (4)$$

$$SLOP=MAX\{C(kj+1)-C(kj),C(kj-1)-C(kj)\} \quad (5)$$

Then, the defocus quantity DEF indicating the extent of defocusing of the subject image plane relative to the estimated focal plane can be determined as expressed in (6) below, based upon the shift quantity x having been calculated.

$$DEF=KX\cdot PY\cdot x \quad (6)$$

PY in expression (6) represents the detection pitch, whereas KX in expression (6) represents the conversion coefficient that is determined in correspondence to the opening angle formed by the gravitational centers of the pair of areas defined on the exit pupil as described earlier.

The judgment as to whether or not the calculated defocus quantity DEF is reliable is made as follows. As shown in FIG. 9B, the interpolated minimum value C(X) of the correlation quantity increases when the level of correlation between the pair of signal strings ei and fi is low. Accordingly, if C (X) is equal to or greater than a predetermined value, the shift quantity is judged to be less reliable. Alternatively, C(X) may be standardized with regard to the contrast in the signal strings ei and fi, and in such a case, if the value obtained by dividing C(X) by SLOP indicating a value in proportion to the contrast is equal to or greater than a predetermined value, the calculated shift quantity should be judged to be not reliable. As a further alternative, if SLOP indicating the value in proportion to the contrast is equal to or less than a predetermined value, the subject should be judged to be a low-contrast subject and, accordingly, the reliability of the calculated defocus quantity DEF should be judged to be low. If the level of correlation between the pair of signal strings ei and fi is low and the correlation quantity C(L) does not dip at all over the shift range Lmin to Lmax, as shown in FIG. 9C, the minimum value C(X) cannot be determined. In this case, it is decided that focus detection cannot be executed.

Figure 10:
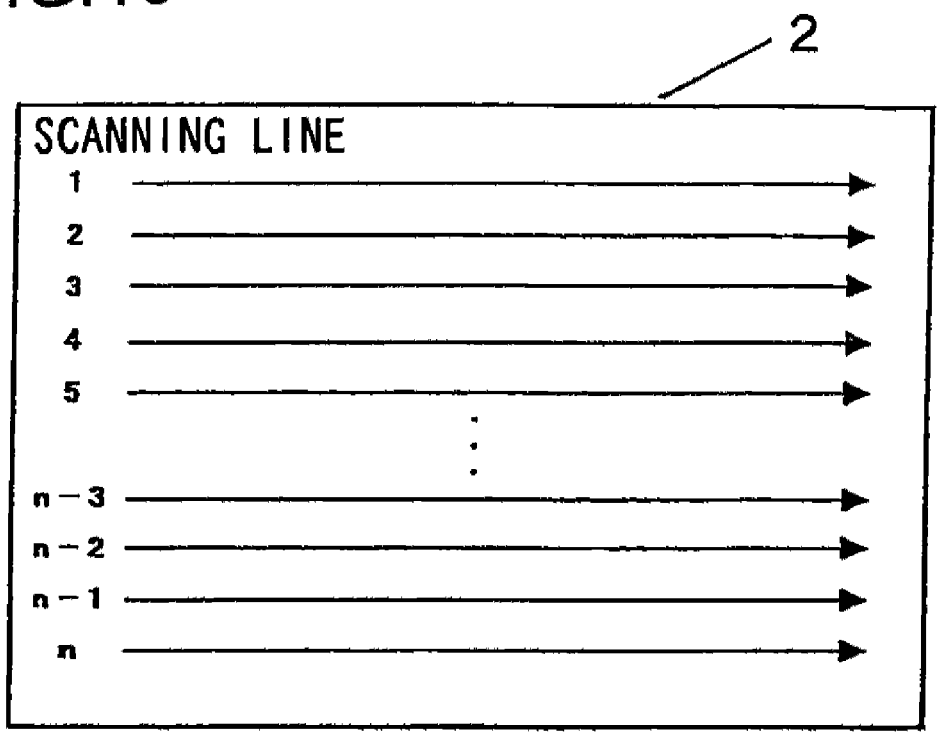
FIG. 10 illustrates a method that may be adopted when reading out pixel signals from the imaging/focus detection element.

Next, a method that may be adopted when reading out signals from the individual pixels at a CMOS imaging/focus detection element 2 through the rolling shutter system is described. FIG. 10 illustrates a scanning method that may be adopted when reading out the signals from the individual pixels at the imaging/focus detection element 2 through the rolling shutter method. As shown in FIG. 10, signals from the individual pixels at the CMOS-type imaging/focus detection element 2 are read by first scanning the imaging/focus detection element along the uppermost scanning line 1 extending along the lateral side (along the left/right direction) of the imaging/focus detection element 2 and then scanning the imaging/focus detection element 2 along lower scanning lines in sequence until the imaging/focus detection element 2 is scanned along the lowermost scanning linen. The pixel signals are read out in units of individual lines in the order corresponding to the scanning line sequence described above. It is to be noted that the lateral side (left/right direction) of the imaging/focus detection element 2 is aligned with the lateral side (left/right direction) of the photographic image plane of the photographic lens 1.

Figure 11:
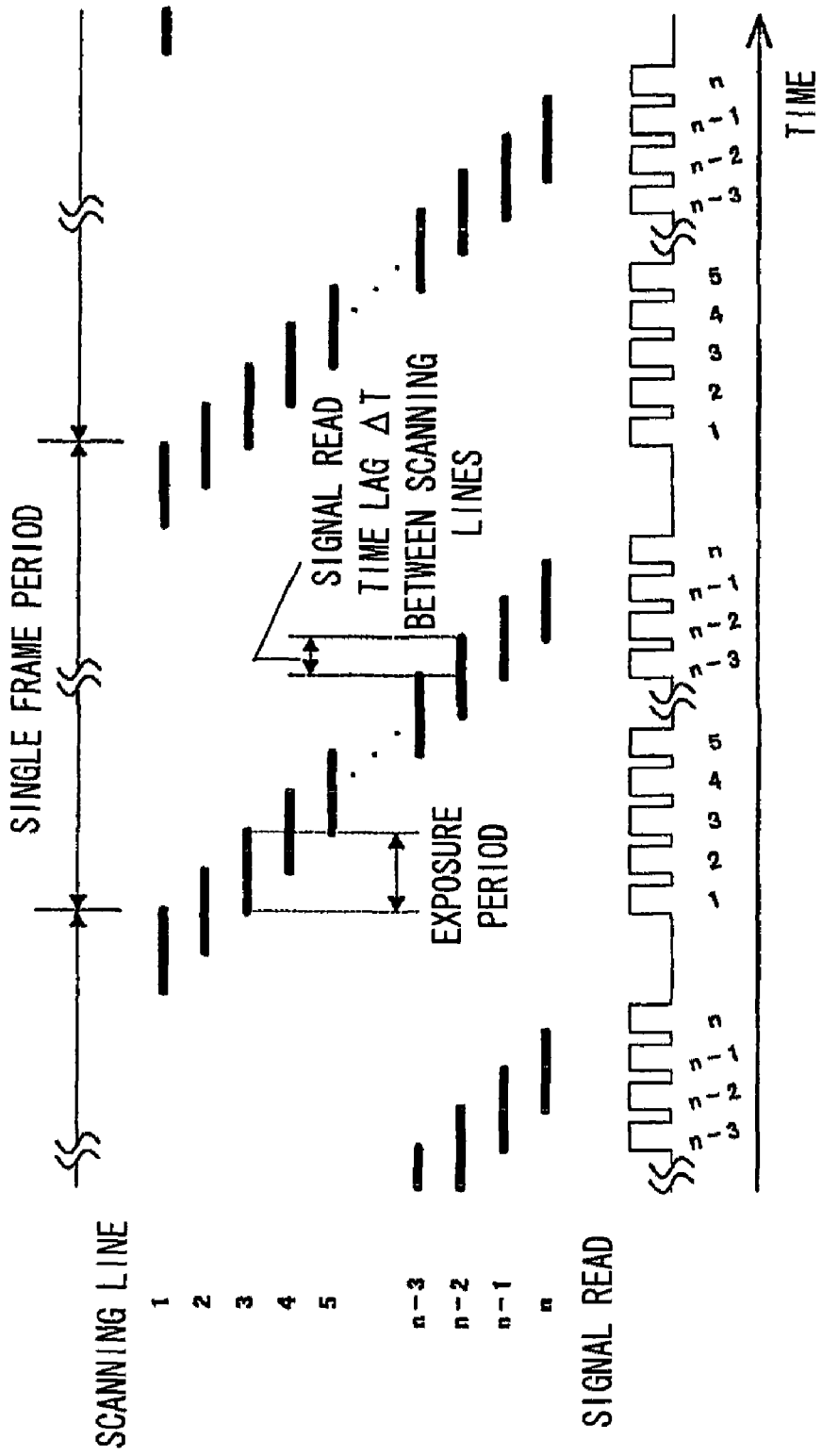
FIG. 11 illustrates a method that may be adopted when reading out pixel signals from the imaging/focus detection element.

FIG. 11 illustrates how the pixel signals along the individual scanning lines are read out. The pixels are exposed in correspondence to the individual scanning lines, starting at the uppermost scanning line 1 and moving down toward the lowermost scanning line n and the pixel signals are read out in correspondence to each scanning line following the exposure. The length of time required to read out the pixel signals starting at the uppermost scanning line 1 and ending at the lowermost scanning line n, is referred to as a frame period. The exposure and signal read operation, lasting over a length of time equivalent to a single frame period, are repeatedly executed. Since the pixel signals are read out in units of individual scanning lines extending along the lateral side (along the left/right direction) of the photographic image plane at the CMOS imaging/focus detection element 2, as described above, a signal read time lag Δt is bound to occur between a given scanning line and the next scanning line.

The focus detection pixel rows 2a, 2b and 2c extend along the lateral side (along the left/right direction) of the photographic image plane (see FIGS. 3 and 5). In other words, the focus detection pixel rows 2a, 2b and 2c are each set on a single scanning line. Thus, as signals along the scanning line corresponding to the focus detection pixel row 2a, 2b or 2c are read out, the focus detection signals from the focus detection pixel row 2a, 2b or 2c are read out all at once. The focus detection pixel rows 2d, 2e and 2f, on the other hand, are set so as to extend along the longitudinal side (up/down direction) of the photographic image plane (see FIGS. 3 and 6). Namely, the focus detection pixel rows 2d, 2e and 2f extend perpendicular to the scanning lines. Accordingly, in order to read out all the focus detection signals from the focus detection pixel row 2d, 2e or 2f, the pixel signals on all the scanning lines intersecting the focus detection pixel row 2d, 2e or 2f must be read out and then the focus detection signals must be extracted from the signals having been read. It is to be noted that the signals having been read out as described above include imaging signals from imaging pixels and the focus detection signals from the focus detection pixels.

Figure 12:
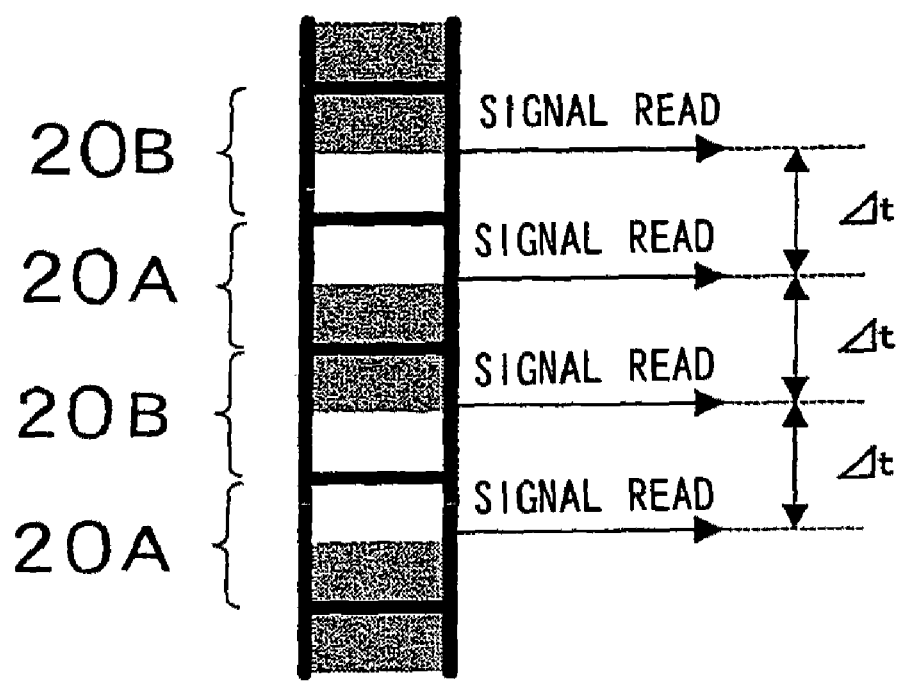
FIG. 12 illustrates a time lag with which signals are read out from the individual focus detection pixels in a focus detection pixel row extending perpendicular to the scanning lines.

As shown in FIG. 12, a time lag equal to the signal read time lag Δt manifesting between one scanning line and the next scanning line, as shown in FIG. 11, occurs as signals from a given focus detection pixel 20A and the adjacent focus detection pixel 20B in each focus detection pixel row among the focus detection pixel rows 2d, 2e and 2f extending perpendicular to the scanning lines, are read. Accordingly, a length of time matching the product obtained by multiplying the time lag Δt by the number of focus detection pixels present in the focus detection pixel row 2d, 2e or 2f extending perpendicular to the scanning lines, will elapse before the signals from all the focus detection pixels in the focus detection pixel row 2d, 2e or 2f are read out.

If an image blur occurs during such a long read time, the focus detection signals having been read out and the actual subject image no longer match, due to noise attributable to the image blur contained in the focus detection signals. Under such circumstances, highly reliable focus detection results cannot be obtained by executing the focus detection calculation (correlation calculation) based upon the focus detection signals and the focus detection itself may be disabled if the extent of image blur is significant.

FIGS. 13 through 17 each presents a flowchart of the photographing operation executed in the embodiment. In reference to the flowcharts, the photographing operation executed in the embodiment is described. As the shutter button at the operation member 11 is pressed halfway down and the shutter release halfway press switch enters an ON state, the CPU 10a at the control device 10 starts executing the photographing program in FIG. 13 and the image blur quantity detection program shown in FIG. 14. These programs are executed concurrently. First, in step 1 in FIG. 13, the CPU 10a executes the focus detection signal read subroutine shown in FIG. 15.

Figure 15:
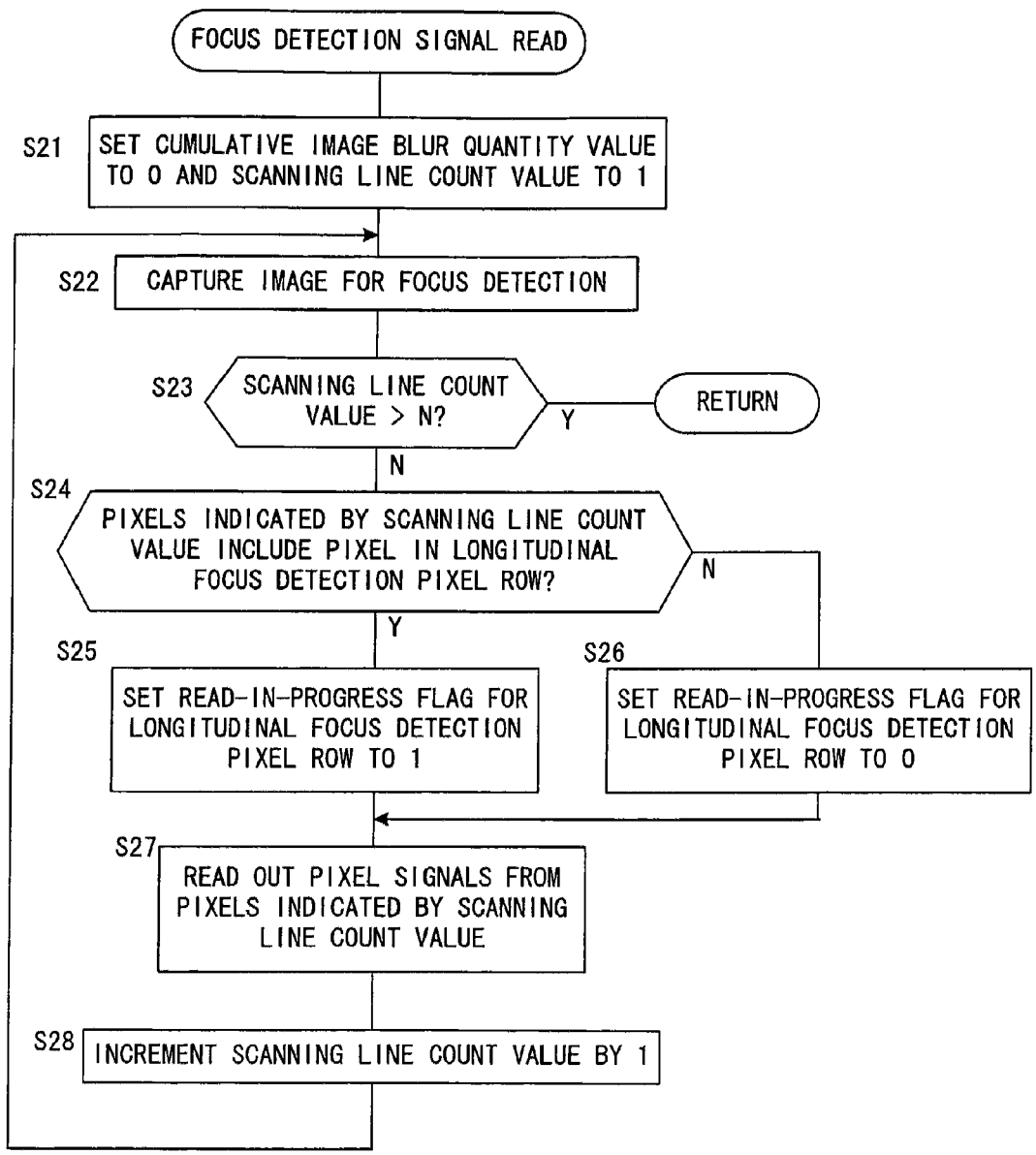
FIG. 15 presents a flow chart of the focus detection signal read subroutine.

In step 21 in FIG. 15, the CPU 10a resets cumulative image blur quantity values, each stored in correspondence to one of the focus detection pixel rows 2a~2f in the memory 10b to 0 and also initializes a scanning line count value stored in the memory 10b to 1. The scanning line counter indicates the position of the scanning line at which image signals are being read out. In step 22, the CPU 10a engages the imaging/focus detection element 2 in imaging operation for purposes of focus detection. Next, in step 23, the CPU 10a makes a decision as to whether or not the value indicated at the scanning line counter is greater than n corresponding to the lowermost scanning line, i.e., whether or not the pixel signal read for one frame (see FIG. 11) has ended. If it is decided that the pixel signal read has ended, the CPU 10a returns to step 2 in FIG. 13, whereas the operation proceeds to step 24 if the pixel signal read has not ended.

In step 24, the CPU 10a makes a decision as to whether or not the pixels in the row indicated by the scanning line count value include a focus detection pixel in the focus detection pixel row 2d, 2e or 2f extending along the longitudinal direction (up/down direction). If such a focus detection pixel is present among the pixels in the row indicated by the scanning line count value, the CPU 10a proceeds to step 25 to set a read-in-progress flag for the longitudinal focus detection pixel row stored in the memory 10b to 1. Otherwise, the CPU 10a proceeds to step 26 to set the read-in-progress flag for the longitudinal focus detection pixel row to 0.

It is to be noted that the read-in-progress flag is set in correspondence to each of the longitudinal focus detection pixel rows 2d, 2e and 2f. The CPU 10a makes a decision in step 24 for each of the focus detection pixel rows 2d, 2e and 2f and sets the respective read-in-progress flag. In step 27, the CPU 10a reads out the pixel signals in the row indicated by the scanning line count value. In the following step 28, the CPU 10a increments the value at the scanning line counter. Subsequently, the CPU 10a returns to step 24 and executes the processing described above again.

Figure 14:
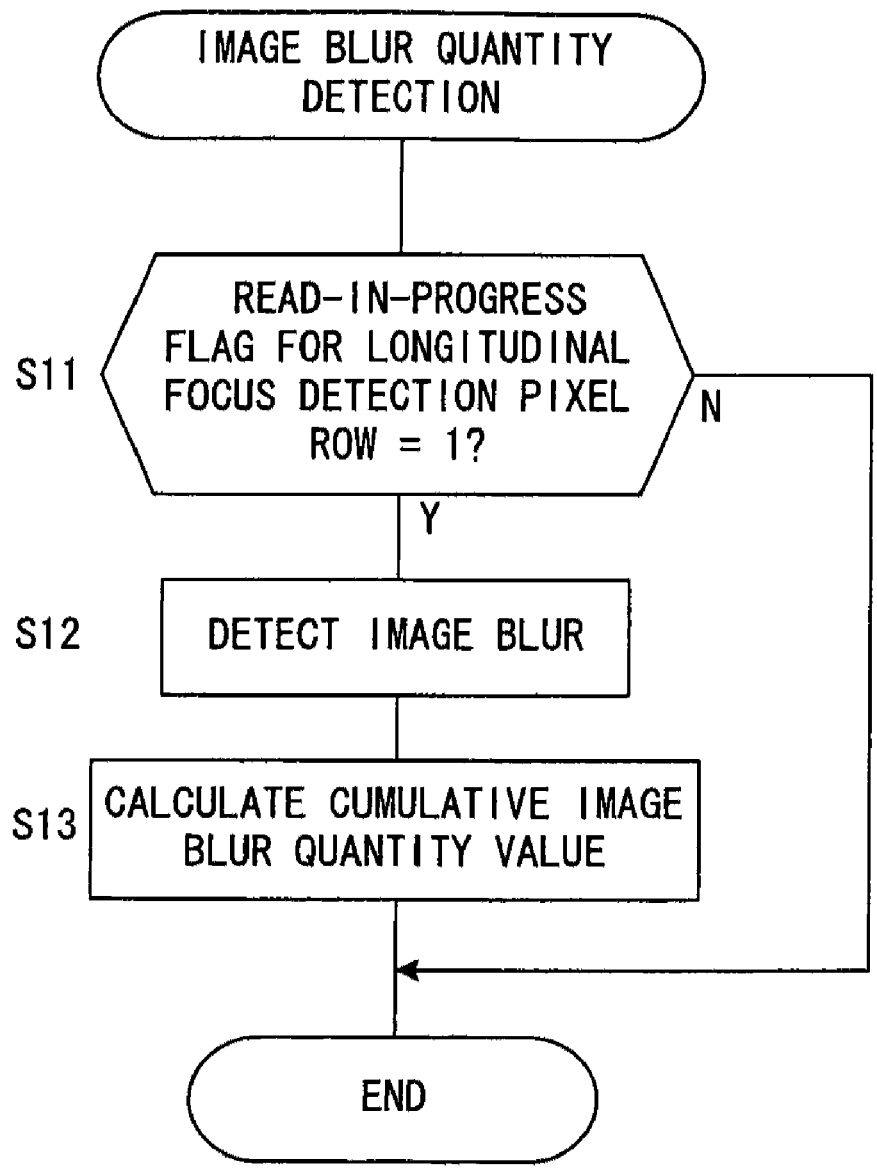
FIG. 14 presents a flowchart of the image blur quantity detection operation executed in the embodiment.

Next, the image blur quantity detection operation in FIG. 14 is described. Each time an interrupt is applied to the CPU 10a at the control device 10 over a predetermined time interval, the CPU 10a executes the image blur quantity detection program. In step 11 in FIG. 14, the CPU 10a makes a decision as to whether or not any read-in-progress flag for the longitudinal focus detection pixel row stored in the memory 10b is set to 1. If 1 is set at a read-in-progress flag, the CPU 10a proceeds to step 12. Otherwise, the CPU 10a ends the execution of the program. If 1 is set at a read-in-progress flag for the longitudinal focus detection pixel row, the CPU 10a inputs the image blur quantity detected via the blur detector 12 in step 12. Then, in step 13, the CPU 10a updates the cumulative image blur quantity value (stored in the memory 10b) of the longitudinal focus detection pixel row corresponding to the read-in-progress flag set at 1 by adding the most recently detected image blur quantity.

Figure 13:
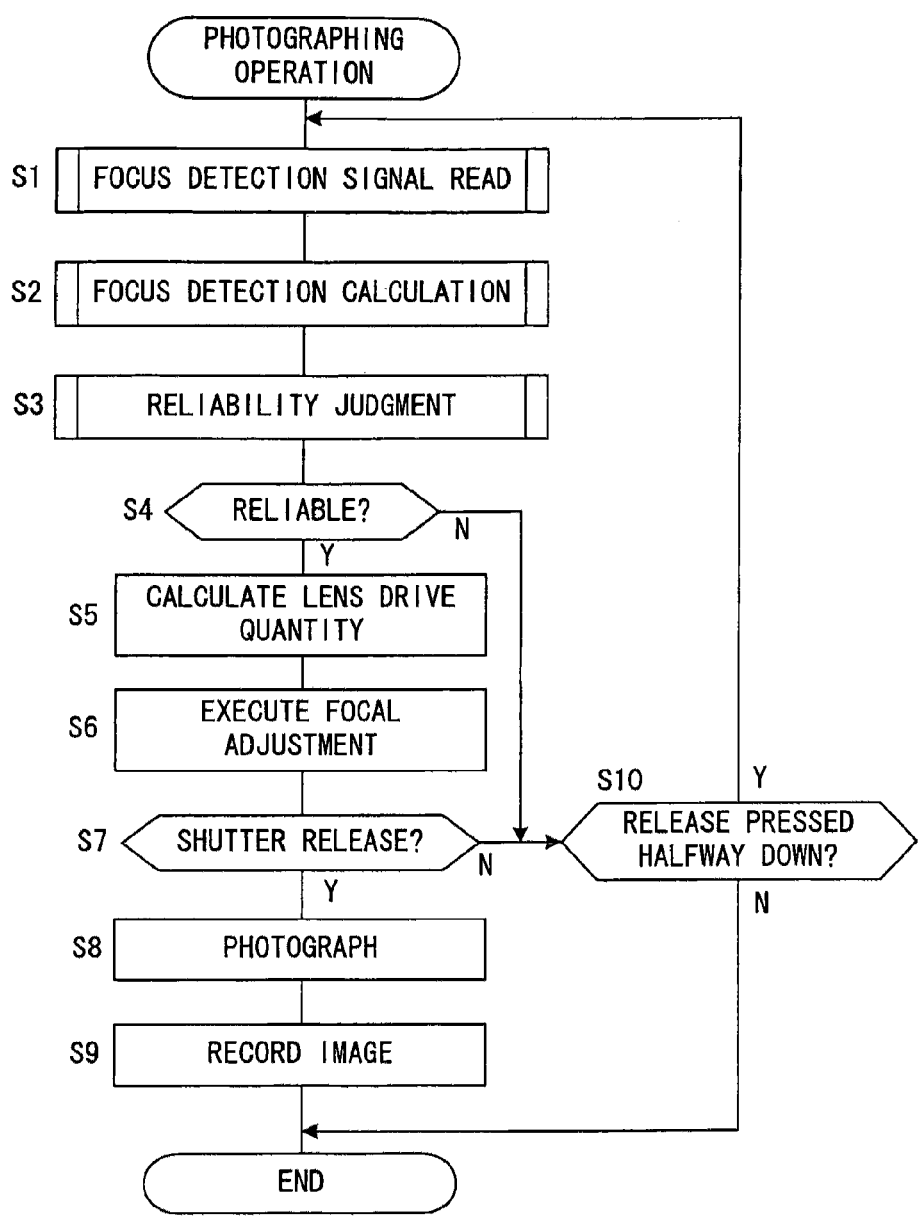
FIG. 13 presents a flowchart of the photographing operation executed in the embodiment.
Figure 16:
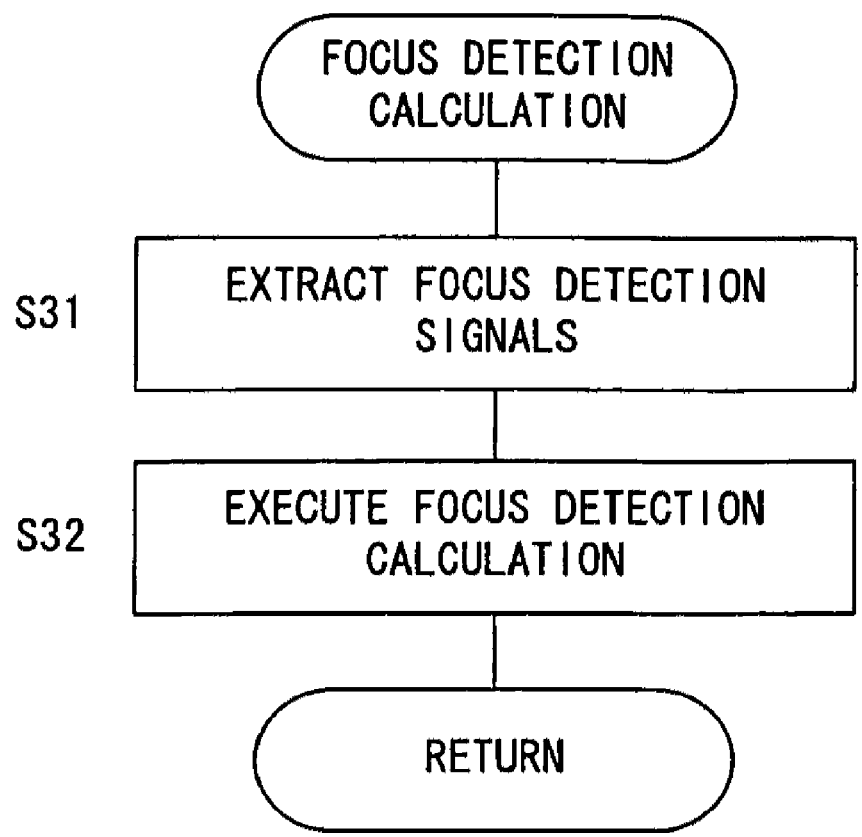
FIG. 16 presents a flow chart of the focus detection calculation subroutine.

In step 2 in FIG. 13, the CPU 10a executes the focus detection calculation subroutine shown in FIG. 16. In step 31 in FIG. 16, the CPU 10a extracts focus detection signals in correspondence to each of the focus detection pixel rows 2a~2f based upon the results of the imaging operation having been obtained in step 1 in FIG. 13 for purposes of focus detection. In the following step 32, the CPU 10a executes the focus detection calculation (correlation calculation) described earlier based upon the focus detection signals for each of the focus detection pixel rows 2a~2f, so as to calculate the defocus quantity. The CPU 10a subsequently makes a return to step 3 in FIG. 13. In step 3 in FIG. 13 following the return, the CPU 1a executes the reliability judgment subroutine shown in FIG. 17.

Figure 17:
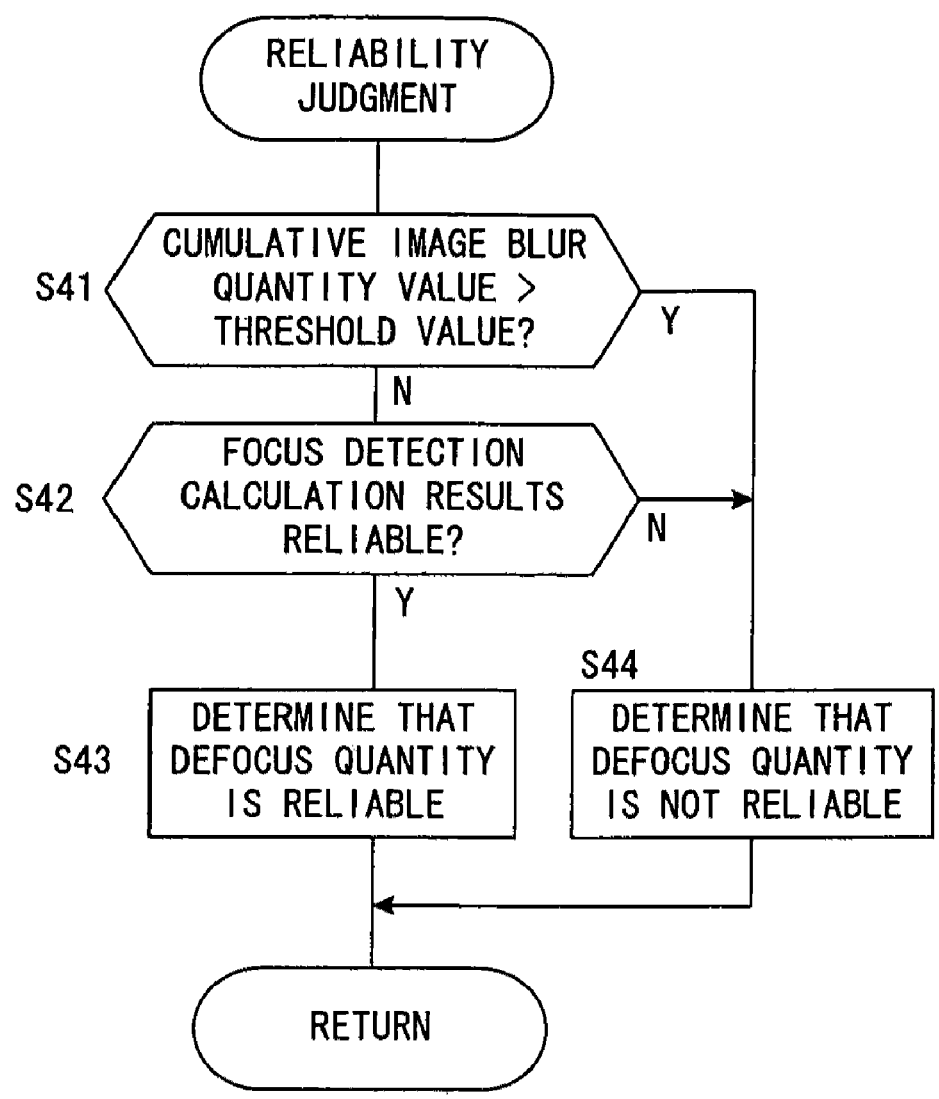
FIG. 17 presents a flowchart of the reliability judgment subroutine.

In step 41 in FIG. 17, the CPU 10a makes a decision for each of the focus detection pixel rows 2d, 2e and 2f as to whether or not the cumulative image blur quantity value stored in the memory 10b in correspondence to the focus detection pixel row 2d, 2e or 2f exceeds a preset threshold value. If the cumulative image blur quantity value exceeds the threshold value, the CPU 10a proceeds to step 44 to determine that the defocus quantity indicating the focus detection results for the focus detection pixel row, the cumulative image blur quantity value of which exceeds the threshold value, is not reliable. If the cumulative image blur quantity value does not exceed the threshold value, the CPU 10a proceeds to step 42 to make a decision as to whether or not the defocus quantities indicating the focus detection results corresponding to all the focus detection pixel rows 2a~2f are reliable (including whether or not focus detection is disabled) through the method described in reference to FIGS. 9A through 9C.

If a given cumulative image blur quantity value is equal to or less than the threshold value and the defocus quantity indicating the corresponding focus detection calculation results is judged to be reliable, the CPU 10a determines in step 43 that the defocus quantity, having been obtained based upon the focus detection signal from the particular focus detection pixel row is reliable. If, on the other hand, the cumulative image blur quantity value exceeds the threshold value or the defocus quantity indicating the calculation results is judged to be unreliable, the CPU 10a determines in step 44 that the focus detection results corresponding to the particular focus detection pixel row is not reliable. Following the reliability judgment, the CPU 10a makes a return to step 4 in FIG. 13.

In step 4 in FIG. 13 following the return, the CPU 10a verifies the reliability of the focus detection results for all the focus detection pixel rows 2a~2f. If the focus detection results corresponding to all the focus detection pixel rows 2a~2f are not reliable, the CPU 10a proceeds to step 10 to make a decision as to whether or not the shutter button at the operation member 11 has been pressed halfway down. If the shutter button has been pressed halfway down, the CPU 10a returns to step 1 to repeat the processing described above. If, on the other hand, the shutter button has not been pressed halfway down, the CPU 10a ends the photographing operation.

If the focus detection results corresponding to any of the focus detection pixel rows 2a~2f are reliable, the CPU 10a proceeds to step 5 to select a single reliable defocus quantity among reliable defocus quantities based upon a predetermined algorithm. The CPU may select, for instance, the defocus quantity indicating the closest range. Subsequently, the CPU 10a calculates a lens drive quantity indicating the distance by which the lens is to be driven to reach the target focus match position based upon the selected defocus quantity. In the following step 6, the CPU 10a engages the drive circuit 8 to drive the focusing lens 1c by a distance matching the lens drive quantity to achieve a focus match.

In step 7, the CPU 10a makes a decision as to whether or not the shutter button at the operation member 11 has been pressed all the way down, i.e., whether or not a shutter release operation has been performed. If a shutter release operation has not been performed, the CPU 10a proceeds to step 10 to make a decision as to whether or not the shutter button is still held halfway down. If the shutter button is still held halfway down, the CPU 10a returns to step 1 to repeat the processing described above. If, on the other hand, the shutter button is no longer held halfway down, the CPU 10a ends the photographing operation.

If a shutter release operation has been performed, the CPU 10a proceeds to step 8 to engage the imaging/focus detection element 2 in imaging operation in order to photograph a picture. In the following step 9, the CPU 10a engages the image processing circuit 5 in various types of correction processing such as white balance adjustment on the image signals obtained through the current photographing operation and generates subject image data by interpolating focus detection pixel outputs (focus detection signals) based upon the outputs (image signals) from nearby imaging pixels. The CPU 10a records the subject image data into the recording device 6 before ending the photographing operation.

The digital camera achieved in the embodiment described above includes the imaging/focus detection element 2 adopting a rolling shutter system, in which the focus detection pixel rows each made up with a plurality of focus detection pixels are incorporated in the two-dimensional array of the plurality of imaging pixels, that receives a light forming an image via the photographic lens 1 and outputs image signals and focus detection signals, and a CPU 10a. The CPU 10a detects a defocus quantity indicating the extent of defocusing manifested at the photographic lens 1 based upon the focus detection signals output from the focus detection pixel rows and also detects the image blur quantity. In addition, the CPU 10a judges whether or not the state of focal adjustment detected for each focus detection pixel row extending along a direction different from the rolling shutter scanning direction is reliable based upon the corresponding image blur quantity and executes focal adjustment for the photographic lens 1 based upon the state of focal adjustment judged to be reliable. As a result, the extent to which the focus detection result reliability is compromised due to an image blur is minimized.

The CPU 10a in the embodiment judges that the defocus quantity calculated for a focus detection pixel row ranging along a direction different from the rolling shutter scanning direction is not reliable if the corresponding cumulative image blur quantity value exceeds a predetermined threshold value. Thus, the extent to which the focus detection result reliability is compromised due to an image blur is minimized.

The CPU 10a in the embodiment detects the image blur quantity in correspondence to each focus detection pixel row and judges whether or not the defocus quantity calculated for the detection pixel row is reliable based upon the image blur quantity detected for the particular focus detection pixel row. Through these measures, the extent to which the focus detection result reliability is compromised due to an image blur can be more completely minimized.

The CPU 10a in the embodiment detects a subject movement as well as an unsteady hand movement of the photographer and detects the image blur quantity based upon the extents of the unsteady hand movement and the subject movement. As a result, an image blur, which is bound to reduce the reliability of the focus detection results, can be detected with a high level of reliability and the extent to which the focus detection result reliability is compromised can be minimized.

Variations of the Embodiment

The present invention may be adopted in all types of digital cameras including digital still cameras, digital video cameras, single-lens reflex digital cameras and compact digital cameras to achieve the advantages described above.

While an explanation is given above in reference to the embodiment on an example in which focus detection pixel rows extending along a direction different from the rolling shutter scanning direction are the focus detection pixel rows 2d, 2e and 2f, extending along the longitudinal side (up/down direction) of the photographic image plane of the photographic lens 1 (see FIG. 3), the focus detection pixel rows may extend along a direction other than the direction running along the longitudinal side of the photographic image plane. By adopting the present invention, the reliability of the defocus quantity detected via any focus detection pixel row extending along a direction intersecting the scanning lines in the rolling shutter system can be judged based upon the image blur quantity. It is to be noted that the quantity of focus detection pixel rows and the directions along which they extend are not limited to those described in reference to the embodiment.

In the embodiment described above, if the cumulative image blur quantity corresponding to a given focus detection pixel row exceeds the threshold value, the defocus quantity detected via a particular focus detection pixel row is judged to be unreliable. However, the reliability judgment threshold value having been described in reference to the FIGS. 9A through 9C may be adjusted in correspondence to the cumulative image blur quantity value. It will be obvious that the reliability judgment threshold value should be adjusted so that the defocus quantity is less likely to be judged reliable when the cumulative image blur quantity value is greater.

As described above, when the CPU 10a calculates a parameter indicating the reliability of the detected defocus quantity and judges the reliability of the defocus quantity by comparing the parameter with the threshold value, the CPU 10a may adjust the threshold value in correspondence to the cumulative image blur quantity value. Through these fine tuning measures, the extent to which the focus detection result reliability is compromised due to an image blur can be minimized even more effectively.

In the embodiment described above, shield masks 24 are disposed at the micro lenses 22 of the focus detection pixels 20A so as to selectively receive a pair of focus detection light fluxes 25 and 26 having passed through the pair of areas defined on the exit pupil of the photographic lens 1. However, the present invention may be adopted in conjunction with focus detection pixels adopting a structure other than that described in reference to the embodiment. Namely, the present invention may be adopted in conjunction with focus detection pixels adopting any structure, as long as they can be used in split-pupil phase difference detection based upon a pair of focus detection light fluxes 25 and 26, having passed through a pair of areas defined on the exit pupil of the photographic lens 1 and selectively received at the detection pixels.

Figure 18A:
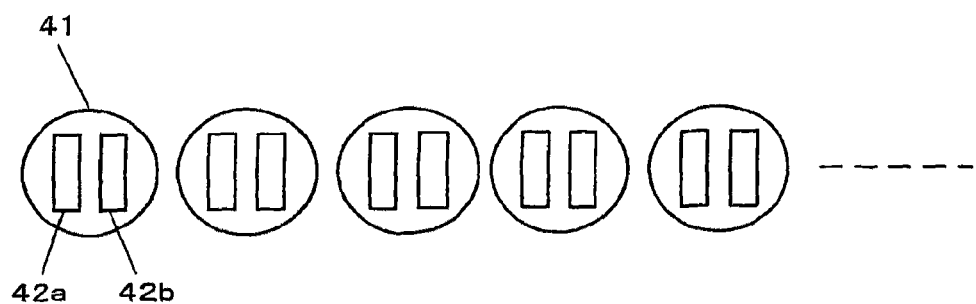
FIGS. 18A, 18B and 18C each present a variation of the imaging/focus detection element.
Figure 18B:
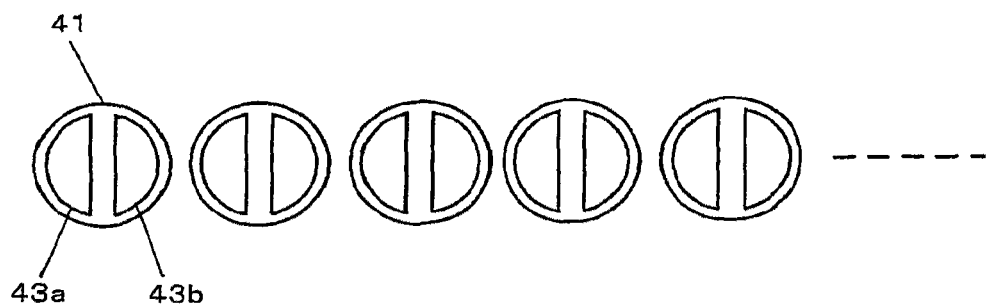
Figure 18C:
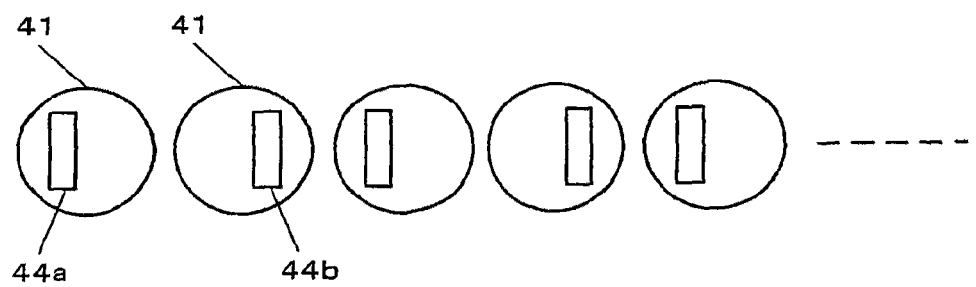

For instance, a pair of focus detection light fluxes having passed through a pair of areas at the exit pupil of the photographic lens may be selectively received at a pair of photoelectric conversion portions 42a and 42b disposed in correspondence to each micro lens 41, as shown in FIG. 18A, instead of splitting the pupil via shield masks. The pair of photoelectric conversion portions may assume a shape other than the rectangular shape shown in FIG. 18A. For instance, a pair of photoelectric conversion portions 43a and 43b assuming a semicircular shape, as shown in FIG. 18B, may be disposed in correspondence to each micro lens. As a further alternative, each pair of photoelectric conversion portions 44a and 44b may be disposed over two micro lenses, so as to selectively receive the pair of focus detection light fluxes having passed through the pair of areas at the exit pupil of the photographic lens via the pair of focus detection pixels adjacent to each other, as shown in FIG. 18C.

What is claimed is:

1. A digital camera, comprising:

an imaging/focus detection element adopting a rolling shutter system, in which a plurality of focus detection pixel rows each made up with a plurality of focus detection pixels are incorporated in a two-dimensional array of a plurality of imaging pixels, that receives a light forming an image via a photographic optical system and outputs image signals and focus detection signals;

a focus detection unit that detects a state of focal adjustment at the photographic optical system based upon the focus detection signals output from the focus detection pixel rows;

an image blur detection unit that detects an image blur quantity indicating an extent of a blur on the image based upon the image signals output from the imaging/focus detection element;

a first reliability judgment unit that judges, based upon the image blur quantity, whether or not the state of focal adjustment detected by the focus detection unit in correspondence to each of first type focus detection pixel rows disposed along a direction different from a rolling shutter scanning direction among the focus detection pixel rows is reliable;

a second reliability judgment unit that judges whether or not the state of focal adjustment detected by the focus detection unit in correspondence to each of the plurality of focus detection pixel rows is reliable, when at least one of the first type focus detection pixel rows among the focus detection pixel rows is judged to be reliable, and a focal adjustment unit that executes focal adjustment for the photographic optical system based upon the state of focal adjustment judged to be reliable by the first reliability judgment unit and the second reliability judgment unit.

2. A digital camera according to claim 1, wherein:
the first reliability judgment unit judges that the state of focal adjustment is not reliable if a cumulative value of the image blur quantity exceeds a predetermined threshold value.

3. A digital camera according to claim 1, wherein:
the second reliability judgment unit includes a comparison judgment unit that calculates a parameter indicating the reliability of the state of focal adjustment and judges the reliability of the state of focal adjustment by comparing the parameter with a threshold value and a modifying unit that modifies the threshold value in correspondence to a cumulative value of the image blur quantity.

4. A digital camera according to claim 1, wherein:
the image blur detection unit detects the image blur quantity in correspondence to each of the focus detection pixel rows; and
the first reliability judgment unit judges the reliability of the state of focal adjustment for each focus detection pixel row based upon the image blur quantity detected in correspondence to the focus detection pixel row.

5. A digital camera according to claim 1, wherein:
the image blur detection unit detects unsteady hand movement of a photographer, detects subject movement and detects the image blur quantity based upon the unsteady hand movement and the subject movement.

6. A digital camera according to claim 1, further comprising a camera vibration detection unit that detects a camera vibration quantity indicating a quantity of a vibration to the digital camera, wherein:
the second reliability judgment unit judges whether or not the state of focal adjustment is reliable based upon the image blur quantity and the camera vibration quantity.

7. A digital camera according to claim 6, wherein:
the second reliability judgment unit judges that the state of focal adjustment is not reliable if a cumulative value of a blurring quantity based upon the image blur quantity and the camera vibration quantity exceeds a predetermined threshold value.

8. A digital camera according to claim 6, wherein:
the second reliability judgment unit includes a comparison judgment unit that calculates a parameter indicating the reliability of the state of focal adjustment and judges the reliability of the state of focal adjustment by comparing the parameter with a threshold value and a modifying unit that modifies the threshold value in correspondence to a cumulative value of a blurring quantity based upon the image blur quantity and the camera vibration quantity.

* * * * *